United States Patent Office 2,835,624
Patented May 20, 1958

2,835,624

METHOD OF ADHERING BUTYL RUBBER TO FABRIC

Edward Cousins, Akron, Ohio, assignor to The Goodyear Tire & Rubber Company, Akron, Ohio, a corporation of Ohio No Drawing. Application October 14, 1954
Serial No. 462,394

16 Claims. (Cl. 154—136)

This invention relates to a treatment of butyl rubber whereby its properties are modified, and improved adhesion of the rubber to filaments, cords, fibers and fabrics is obtained. More particularly this invention relates to a new and improved method of effecting a bond between butyl rubber and materials such as regenerated cellulose, nylon, cotton and other fibers.

The problem of adhering rubbers to filamentous materials has presented many difficulties. Of the various rubbers which it is desired to adhere to these materials, the one which has been the most difficult to get to adhere is butyl rubber. This is thought to be due to the small proportion of unsaturated bonds in butyl rubber and also to the tendency of butyl rubber to undergo plastic flow when put under stress.

It is an object of this invention to provide a method of securing an improved bond between yarns, cords, fabrics and the like and butyl rubber. It is another object of this invention to modify the characteristics of butyl rubber to improve its adhesive power. It is still another object to provide fabric-reinforced butyl rubber structures of improved strength and durability. Other objects will appear hereinafter as the description of the invention proceeds.

The objects of this invention are accomplished in general by applying to yarns, filaments, cords, fabrics or the like a butyl rubber containing an organic isocyanate and an aromatic dinitroso compound or an aromatic dioxime and bonding the resulting composite structure to butyl rubber by associating the said composite structure with unvulcanized butyl rubber and vulcanizing the same. Thus, according to this invention, butyl rubber is mixed with an organic isocyanate and an aromatic dinitroso compound or an aromatic dioxime to modify its properties and to improve its adhesiveness to filaments, fibers, cords, fabrics and the like. The exact nature of the reactions occurring is not known, but an improvement in the adhesiveness of the rubber is obtained and a decrease in the plastic flow of the rubber results.

The term "butyl rubber" as used in the specification and in the appended claims is well known in the art as descriptive of the elastomeric polymers formed by polymerizing a major proportion of an iso-olefin, such as isobutylene, with a minor proportion of a multi-olefin, such as for example, isoprene, butadiene, piperylene, dimethyl butadiene, and similar multi-olefinic unsaturates. The monoolefin is preferably used in proportions of from 99.5 to 80 parts of the monoolefin to from 0.5 to 20 parts of the diolefin. The preparation of the rubbers forms no part of this invention and the foregoing is merely given as illustrative of the rubbers used in practicing this invention.

In order to more clearly illustrate the principles of this invention and how it may be accomplished it will be described with particular reference to fibrous reinforcing structures comprising regenerated cellulose filaments. The invention is not limited to reinforcing structures comprising regenerated cellulose filaments, however, as other kinds of filamentous reinforcing structures may be used and equally good results obtained.

Untreated rayon cords, when cured into a butyl rubber stock, adhere only weakly to the butyl rubber. Cords treated with a solution of butyl rubber and dried, and then cured into butyl rubber stock showed some improvement in adhesion. Cords treated with a solution of butyl rubber containing an organic isocyanate, dried, and then cured into a butyl rubber stock show still better adhesion, but even here the bond between the rubber and the cord is not entirely satisfactory. According to this invention it has been found that when rayon cords are treated with a solution of butyl rubber compound containing an organic isocyanate and a small amount of polyparadinitrosobenzene a much greater improvement of the bond between the rubber and the rayon is obtained, and fabric-reinforced butyl rubber goods can be made which possess a very satisfactory bond between the rubber and the fabric.

The invention is specifically illustrated in the following examples:

A 7 to 8% solution of compounded butyl rubber was made in a solvent which was a mixture of moderately high-boiling petroleum ether, say 90 to 120° C., diluted with toluene. To this solution there were added activating ingredients, as tabulated below, which improved the adhesiveness of butyl rubber to rayon cord. The cord to be coated with adhesive was dipped in the solution, then dried and imbedded in butyl rubber and cured. Adhesion tests were run at room temperature. The improved results obtained according to this invention are illustrated in the following table which shows the materials dissolved in the solutions used to treat the rayon cords. Concentrations are expressed as parts by weight (based on the butyl rubber in the solution as 100).

Table I

| Butyl Rubber | Polyisocyanate | Nitrosobenzene Composition | Static Adhesion |
|---|---|---|---|
| Control | (Undipped rayon cord). | | 4 to 5 |
| 100 | | | 6.7 |
| 100 | 10 | | 7.0 |
| 100 | 20 | | 7.9 |
| 100 | 30 | | 8.1 |
| 100 | | 2.0 | 8.7 |
| 100 | | 8.0 | 9.5 |
| 100 | | 16.0 | 9.1 |
| 100 | 30 | 2.0 | 11.1 |
| 100 | 30 | 8.0 | ¹ 13.0 |
| 100 | 30 | 16.0 | ¹ 11.5 |

¹ When adhesions were in the range above 11 or 12 pounds the rupture was practically always in the rubber phase.

In the above table the nitrosobenzene composition is a mixture of 25% of polyparadinitrosobenzene and 75% of inert petroleum wax. It is obtainable from the E. I. du Pont de Nemours & Company under their trademark Polyac. The static adhesion is measured at room temperature and is expressed in pounds pull required to separate the cord from the rubber. The polyisocyanate is a mixture of diisocyanate, triisocyanate, tetraisocyanate, etc., prepared by the phosgenation of an aniline-formaldehyde condensation product described in U. S. Patent No. 2,683,730, issued July 13, 1954. This polyisocyanate mixture has an amine equivalent of approximately 254.

In the above table the invention is carried out using a polyisocyanate mixture and polyparadinitrosobenzene. Any organic isocyanate can be substituted for the mixture and any aromatic dinitroso compound or dioxime can be substituted for the polyparadinitrosobenzene used in the above examples. The amounts of isocyanate and dinitrosobenzene employed are not critical. The amounts used for the purposes of this invention will usually be from 5 to 50 parts by weight of the isocyanate and from 0.25 to 10.0 parts by weight of the dinitrosobenzene, preferably from 10 to 30 parts by weight of the isocyanate and from 0.5 to 4.0 parts by weight of the dinitrosobenzene to 100 parts by weight of butyl rubber in the solution.

There are several ways of accomplishing this invention. The method shown above is to apply to the fabric, or other material to be used as a reinforcing structure, a solution of butyl rubber compound containing a polyisocyanate and polyparadinitrosobenzene, evaporate the solvent to dry the treated fabric, imbed the treated fabric in a mass of vulcanizable butyl rubber and heat under pressure to effect a cure of the composite article whereby good adhesion between the rubber mass and the reinforcing structure is obtained. An alternative method of accomplishing this invention is to coat or impregnate the fabric or other reinforcing structure with a solution of compounded butyl rubber containing a polyisocyanate, dry to remove the solvent, imbed the thus treated structure in an unvulcanized butyl rubber stock to which polyparadinitrosobenzene has been applied, and heat under presure to effect a cure of the composite mass whereby good adhesion of the butyl rubber to the imbedded structure is obtained. Other equivalent ways of carrying out the invention will be apparent to those familiar with the art. The manner of associating the materials together is not critical for the improved results can be obtained as illustrated if all of the requisite materials are intimately associated during the curing period.

Various solvents, such as ethylene dichloride, methylene dichloride, toluene, xylene, petroleum ether, or mixtures of these solvents can be used, the solvent being selected with respect to the solubility of the various materials in the solvent and the absence of active hydrogen which would react with the isocyanate groups.

Any organic isocyanate may be used in the practice of this invention, including both aliphatic and aromatic isocyanates. Representative examples of such isocyanates are: monoisocyanates such as the aliphatic compounds, ethyl isocyanate, isobutyl isocyanate, and octadecyl isocyanate and the aromatic compounds such as phenyl isocyanate, naphthyl isocyanate, and tolyl isocyanate; the diisocyanates such as the aliphatic compounds ethylene diisocyanate, hexamethylene diisocyanate, propylene-1,2 diisocyanate, butylene-1,2 diisocyanate, and ethylidene diisocyanate; the cycloalkalene compounds, such as cyclopentylene-1,3 diisocyanate and cyclohexylene-1,2 diisocyanate; the aromatic compounds such as paraphenylene diisocyanate, 4,4'-diphenylene diisocyanate and 1,5-naphthalene diisocyanate; the aliphatic-aromatic compounds such as 4,4'-diphenylene methane diisocyanate and toluene 2,4-diisocyanate and nuclear substituted aromatic compounds such as diphenyl, 3,3'-dimethoxy, 4,4'-diisocyanate and 4,4'-diphenyl ether diisocyanate; the triisocyanates such as 4,4',4''-triphenyl methane triisocyanate and toluene 2,4,6-triisocyanate; the tetraisocyanates such as 4,4'-dimethyl diphenyl methane, 2,2',5,5'-tetraisocyanate and the higher polyisocyanates.

Mixtures of the isocyanates may also be employed. The isocyanate mixtures which have been found to be particularly effective in accomplishing the purposes of this invention are those described in U. S. Patent 2,683,730, issued July 13, 1954. These mixtures, as described therein, are the polyisocyanates resulting from the phosgenation of the condensation products of aryl-mono primary amines and aliphatic or aromatic aldehydes or ketones.

The mixture of polyisocyanates described in the above cited U. S. Patent No. 2,683,730 is defined by the formula $$OCN-R-(CY_2-R'-NCO)_n$$

in which R and R'' are arylene radicals, Y is selected from the group consisting of hydrogen, alkyl, and aryl radicals, $n$ is a whole number, and the $(CY_2-R'-NCO)$ groups in excess of one are attached to an R' radical.

The prefered polyisocyanates are those obtained by the phosgenation of the polyamines resulting from the reaction of aniline with formaldehyde, benzaldehyde, acetaldehyde, methyl ethyl ketone, or acetone; orthotoluidine with formaldehyde, benzaldehyde, acetaldehyde, methyl ethyl ketone or acetone; orthochloroaniline with formaldehyde, benzaldehyde, acetaldehyde, methyl ethyl ketone or acetone; orthoanisidine with formaldehyde, benzaldehyde, acetaldehyde, methyl ethyl ketone, or acetone; and alphanaphthylamine with formaldehyde, benzaldehyde, acetaldehyde, methyl ethyl ketone or acetone.

Particularly preferred are the mixtures of polyisocyanates in which the diisocyanate portion is present in an amount not to exceed 40% by weight of the mixture. These mixtures are prepared by controlling the molecular ratio of amine to aldehyde or ketone in the range of from 4:2.5 to 4:3.5 with the amine being present in the larger molecular amount.

While the monoisocyanates and the diisocyanates are effective in accomplishing this invention, it is the higher polyisocyanates and particularly the polyisocyanate mixtures described above which are preferably employed.

Any aromatic dinitroso compound can be used in the practice of this invention. Representative examples of the aromatic compounds are the aryl compounds, which are preferred, such as the dinitroso derivatives of benzene, cymene, toluene, and naphthalene. The paradinitroso compounds are preferred because they are more readily available commercially, particularly paradinitrosobenzene and polyparadinitrosobenzene because they are easily obtained and are highly efficient.

It is known that dioximes can be oxidized to the corresponding dinitroso compounds. A dioxime, therefore, will produce the same effect as if the dinitroso compound had been added initially. For the purpose of this invention, the dioximes can be considered as the equivalents of the corresponding dinitroso compounds into which they can be oxidized. Representative examples of the dioximes which are useful in the practice of this invention are paraquinone dioxime, naphthoquinone dioxime, toluquinone dioxime, diphenoquinone dioxime, and diquinoyl dioxime. Mixtures of the dinitroso and dioxime compounds can also be employed.

The fabric or other filamentary structure used in this invention may be regenerated cellulose produced by the viscose process or regenerated cellulose produced by the cuprammonium process, or cellulose modified by the acetate process. Cotton may also be bonded to butyl rubber by the method of this invention. Nylon and other synthetic fibers also may be treated according to this invention.

While certain representative embodiments and details have been shown for the purpose of illustrating the invention, it will be apparent to those skilled in this art that various changes and modifications may be made therein without departing from the spirit or scope of the invention.

I claim:

1. The method of adhering a synthetic rubber formed by polymerizing a major proportion of a monoolefin with a minor proportion of a multiolefin to a fibrous reinforcing structure which comprises applying to the said fibrous reinforcing structure a portion of the synthetic rubber, an organic isocyanate and an organic nitrogen-bearing compound from the group consisting of aryl dinitroso compounds and aryl dioximes, associating the treated fibrous structure with a vulcanizable mass of said synthetic rubber and subjecting the composite mass to curing conditions.

2. The method of adhering a synthetic rubber formed by polymerizing a major proportion of a monoolefin with a minor proportion of a multiolefin to a fibrous reinforcing structure which comprises applying to said fibrous reinforcing structure a portion of the synthetic rubber, an organic nitrogen-bearing compound from the group consisting of aryl dinitroso compounds and aryl dioximes and an organic isocyanate from the group consisting of monoisocyanates, polyisocyanates and mixed monoisocyanatepolyisocyanate compounds, associating the treated fibrous structure with a vulcanizable mass of said synthetic rubber and subjecting the composite mass to curing conditions.

3. The method of adhering a synthetic rubber formed by polymerizing a major proportion of a monoolefin with a minor proportion of a multiolefin to a fibrous regenerated cellulose structure which comprises applying to the said fibrous regenerated cellulose structure a portion of the synthetic rubber, an organic nitrogen-bearing compound from the group consisting of aryl dinitroso compounds and aryl dioximes and an organic isocyanate from the group consisting of monoisocyanates, polyisocyanates, and mixed monoisocyanate-polyisocyanate compounds, associating the treated fibrous structure with a vulcanizable mass of said synthetic rubber, and subjecting the composite mass to curing conditions.

4. The method of adhering a synthetic rubber formed by polymerizing a major proportion of a monoolefin with a minor proportion of a multiolefin to a fibrous regenerated cellulose structure which comprises applying to the said fibrous regenerated cellulose structure a portion of the synthetic rubber, a paradinitrosobenzene, and a polyisocyanate, associating the treated fibrous structure with a vulcanizable mass of said synthetic rubber and subjecting the composite mass to curing conditions.

5. The method of adhering a synthetic rubber formed by polymerizing a major proportion of a monoolefin with a minor proportion of a multiolefin to a fibrous regenerated cellulose structure which comprises applying to said fibrous regenerated cellulose structure a portion of the synthetic rubber, polyparadinitrosobenzene, and a polyisocyanate, associating the treated fibrous structure with a vulcanizable mass of said synthetic rubber and subjecting the composite mass to curing conditions.

6. The method of adhering a synthetic rubber formed by polymerizing a major proportion of a monoolefin with a minor proportion of a multiolefin to a fibrous regenerated cellulose structure which comprises applying to the said fibrous regenerated cellulose structure a solution of the synthetic rubber compound containing polyparadinitrosobenzene and an organic polyisocyanate, drying the treated regenerated cellulose structure, associating the treated structure with a vulcanizable mass of said synthetic rubber and subjecting the mass to curing conditions.

7. The method of adhering a synthetic rubber formed by polymerizing a major proportion of a monoolefin with a minor proportion of a multiolefin to a fibrous regenerated cellulose structure which comprises applying to the said fibrous regenerated cellulose structure a solution of the synthetic rubber compound containing from 5 to 50 parts by weight of an organic polyisocyanate and from 0.25 to 10.0 parts by weight of polyparadinitrosobenzene per 100 parts by weight of the synthetic rubber in said solution, drying the treated cellulose structure, associating the treated structure with a vulcanizable mass of said synthetic rubber and subjecting the mass to curing conditions.

8. The method of adhering a synthetic rubber formed by polymerizing a major proportion of a monoolefin with a minor proportion of a multiolefin to a fibrous regenerated cellulose structure which comprises applying to the said fibrous regenerated cellulose structure a solution of the synthetic rubber compound containing from 10 to 30 parts by weight of an organic polyisocyanate and from 0.5 to 4.0 parts by weight of polyparadinitrosobenzene per 100 parts by weight of the synthetic rubber in said solution, drying the treated cellulose structure, associating the treated structure with a vulcanizable mass of said synthetic rubber and subjecting the mass to curing conditions.

9. The method of adhering a synthetic rubber formed by polymerizing a major proportion of a monoolefin with a minor proportion of a multiolefin to a fibrous regenerated cellulose structure which comprises applying to the said fibrous regenerated cellulose structure a solution of the synthetic rubber compound containing from 10 to 30 parts by weight of a mixture of organic polyisocyanates of the general formula $OCN-R-(CY_2-R'-NCO)_n$ in which R and R' are arylene radicals and Y is selected from the group consisting of hydrogen, alkyl, and aryl radicals, $n$ is a whole number, and the $CY_2-R'-NCO$) groups in excess of one are attached to an R' radical and 0.5 to 4.0 parts by weight of polyparadinitrosobenzene per 100 parts of rubber in said solution, drying the treated cellulose structure, associating the treated structure with a vulcanizable mass of said synthetic rubber and subjecting the mass to curing conditions.

10. The method of claim 9 in which the mixture of polyisocyanates is comprised of up to 40% by weight of diisocyanate and from 100% to 60% by weight of polyisocyanates containing more than two —NCO equivalents per mol of polyisocyanate.

11. Vulcanized rubber articles reinforced with a fibrous cellulose reinforcing structure bonded to a vulcanized rubbery copolymer of a major proportion of a monoolefin with a minor proportion of a multiolefin by means of said rubbery copolymer, polyparadinitrosobenzene and an organic isocyanate selected from the group consisting of monoisocyanates, polyisocyanates, and mixed monoisocyanate-polyisocyanate compounds.

12. Vulcanized rubber articles reinforced with a fibrous regenerated cellulose reinforcing structure bonded to a vulcanized rubbery copolymer of a major proportion of a monoolefin with a minor proportion of a multiolefin by means of said rubbery copolymer, polyparadinitrosobenzene and an organic isocyanate selected from the group consisting of monoisocyanates, polyisocyanates, and mixed monoisocyanate-polyisocyanate compounds.

13. Vulcanized rubber articles reinforced with a fibrous cellulose reinforcing structure bonded to a vulcanized rubbery copolymer of a major proportion of a monoolefin with a minor proportion of a multiolefin by means of the rubbery copolymer, polyparadinitrosobenzene and an organic polyisocyanate.

14. Vulcanized rubber articles reinforced with a fibrous regenerated cellulose reinforcing structure bonded to a vulcanized rubbery copolymer of a major proportion of a monoolefin with a minor proportion of a multiolefin by means of said rubbery copolymer, polyparadinitrosobenzene and an organic polyisocyanate.

15. A vulcanized rubber article comprising a synthetic rubber formed by polymerizing a major proportion of a monoolefin with a minor proportion of a multiolefin, a regenerated cellulose fibre reinforcement incorporated in said rubber and a dinitrosobenzene-organic isocyanate, said synthetic rubber induced bond between said synthetic rubber and said fibre reinforcement.

16. A vulcanized rubber article comprising a synthetic rubber formed by polymerizing a major proportion of isobutylene with a minor proportion of isoprene, a regenerated cellulose fibre reinforcement incorporated in said synthetic rubber and a dinitrosobenzene-organic isocyanate, said synthetic rubber induced bond between said rubber and said fibre reinforcement.

(References on following page)

References Cited in the file of this patent

UNITED STATES PATENTS

| | | |
|---|---|---|
| 2,436,222 | Neal et al. | Feb. 17, 1948 |
| 2,690,780 | Cousins | Oct. 5, 1954 |
| 2,741,295 | Kindle et al. | Apr. 10, 1956 |
| 2,752,978 | Kindle et al. | July 3, 1956 |

FOREIGN PATENTS

| | | |
|---|---|---|
| 118,839 | Australia | Aug. 17, 1944 |

OTHER REFERENCES

Trans. Inst. Rubber Industry, October 1949, pages 150, 151, 162–166.

Industrial and Engineer Chemistry, December 1948, vol. 40, No. 12, pages 2314–2319.

Rubber Chem. and Tech., October 1946, pages 900–914.